(12) United States Patent
Shen

(10) Patent No.: US 10,871,805 B2
(45) Date of Patent: Dec. 22, 2020

(54) HARD DISK DRIVE TRAY

(71) Applicant: Super Micro Computer Inc., San Jose, CA (US)

(72) Inventor: William Shen, San Jose, CA (US)

(73) Assignee: SUPER MICRO COMPUTER INC.

(*) Notice: Subject to any disclaimer, the term of this patent is extended or adjusted under 35 U.S.C. 154(b) by 0 days.

(21) Appl. No.: 16/288,813

(22) Filed: Feb. 28, 2019

(65) Prior Publication Data

US 2020/0278725 A1    Sep. 3, 2020

(51) Int. Cl.
*A47F 5/00* (2006.01)
*G06F 1/18* (2006.01)
*G11B 33/12* (2006.01)

(52) U.S. Cl.
CPC ............ *G06F 1/187* (2013.01); *G11B 33/124* (2013.01)

(58) Field of Classification Search
CPC ..... G06F 1/187; G11B 33/124; G11B 33/025; H05K 7/1489; H05K 7/1415
USPC ........ 248/298.1; 361/679.33, 679.37, 679.43
See application file for complete search history.

(56) References Cited

U.S. PATENT DOCUMENTS

| | | | | |
|---|---|---|---|---|
| 2012/0138493 A1* | 6/2012 | Tung-Ke | ................ | G11B 33/08 206/320 |
| 2013/0128447 A1* | 5/2013 | Liu | ......................... | G06F 1/187 361/679.33 |
| 2015/0109726 A1* | 4/2015 | Li | ........................... | F16B 21/08 361/679.33 |
| 2019/0325917 A1* | 10/2019 | Chang | .................. | G11B 33/124 |

* cited by examiner

*Primary Examiner* — Todd M Epps
(74) *Attorney, Agent, or Firm* — Chun-Ming Shih; HDLS IPR Services

(57) ABSTRACT

A hard disk drive tray for accommodating a hard disk drive is provided. The hard disk drive tray has a front frame. An elastic cantilever plate is extended from each of two ends of the front frames. The couple of elastic cantilever plates are arranged parallel with each other for clamping the hard disk drive between the couple of elastic cantilever plates. A lateral surface of each elastic cantilever plate is covered by a side case and an expansion fastening bolt for fastening the hard disk drive is arranged protruding from the other lateral surface of each elastic cantilever plate. The hard disk drive is clamped by, the elastic cantilever plates, a simplified structure of the hard disk drive tray. The elastic cantilever plate is covered by the side case and thereby reinforced.

11 Claims, 9 Drawing Sheets

HARD DISK DRIVE TRAY

BACKGROUND OF THE INVENTION

Technical Field

The present disclosure relates to a hard disk drive tray, and more particularly to a clamping type hard disk drive tray.

Description of Related Art

The present disclosure relates to a hard disk drive tray, the hard disk drive tray is applied in a server or a high-performance computer and a hard disk drive could be accommodated therein the, the hard disk drive tray could be rapidly inserted into or removed from the server and therefore easy to be replaced. Usually, a large number of hard disk drives are arranged in the server, and a process of maintaining the hard disk drives is time consuming. Time for maintaining the hard disk drive could be reduces by the hard disk drive tray.

However, a hard disk drive should be screwed in the hard disk drive tray by at least four screws. A conventional server processing a large amount of data, and a process of screwing and maintaining the large number of hard disk drives therein is therefore also time consuming.

In views of this, in order to solve the above disadvantage, the present inventor studied related technology and provided a reasonable and effective solution in the present disclosure.

SUMMARY OF THE INVENTION

A hard disk drive tray clamping and fastening a hard disk drive is provided in the present disclosure.

A hard disk drive tray for accommodating a hard disk drive is provided in the present disclosure. The hard disk drive tray has a front frame. An elastic cantilever plate is extended from each of two ends of the front frames. The couple of elastic cantilever plates are arranged parallel with each other for clamping the hard disk drive between the couple of elastic cantilever plates. A lateral surface of each elastic cantilever plate is covered by a side case and an expansion fastening bolt for fastening the hard disk drive is arranged protruding from the other lateral surface of each elastic cantilever plate.

According to the hard disk drive tray of the present disclosure, at least a hook is extended from an edge of each elastic cantilever plate, and the respective hooks hook the respective corresponding side cases.

According to the hard disk drive tray of the present disclosure, an internal flange is formed by an inward reversed edge of the side case to be extended, and the internal flange is arranged surrounding the side case and covering an edge of the elastic cantilever plate. An opening is defined on the internal flange at an end of the side case, a latch is arranged in the opening, the elastic cantilever plate is inserted in the side case through the opening, and the latch latches the edge of the elastic cantilever plate.

According to the hard disk drive tray of the present disclosure, the respective elastic cantilever plates are one piece extended from the front frame.

According to the hard disk drive tray of the present disclosure, a slider structure arranged along a longitudinal direction of the corresponding elastic cantilever plate is formed on an external surface of each side case. A positioning arm is formed on a surface of each elastic cantilever plate, the respective positioning arms are arranged penetrating through the respective corresponding side case and thereby arranged protruding from a surface of the slider structure.

According to the hard disk drive tray of the present disclosure, a communicating channel is defined on the side case and along the longitudinal direction of the corresponding elastic cantilever plate, and a light guiding bar is inserted in the communicating channel. A panel is arranged on the front frame and an end of the light guiding bar is exposed on the panel. A panel is arranged on the front frame and an end of the light guiding bar is exposed on the panel.

According to the hard disk drive tray of the present disclosure, a positioning pin for fastening the hard disk drive is arranged protruding from the elastic cantilever plate, the positioning pin and the expansion fastening bolt are arranged on the same surface of the elastic cantilever plate, the positioning pin is arranged between the front frame and the expansion fastening bolt, and the positioning pin is shorter than the expansion fastening bolt.

According to the hard disk drive tray of the present disclosure, the hard disk drive is fastened by the couple of elastic cantilever plates and the expansion fastening bolt, and a structure of the hard disk drive tray is simplified by a reversed idea of attaching the hard disk drive tray on the hard disk drive.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
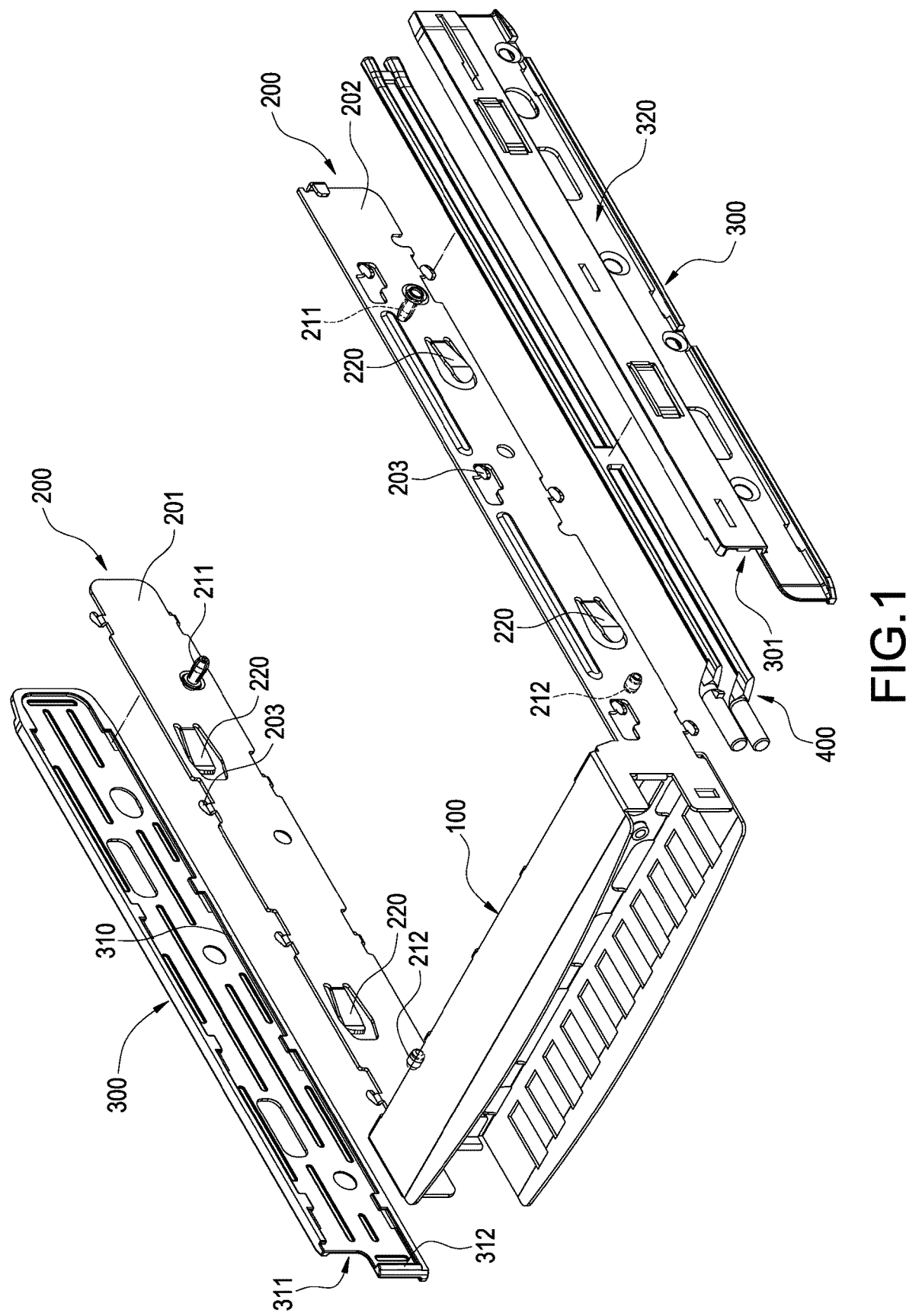
FIG. 1 is an exploded view showing a hard disk drive tray according to the first embodiment of the present disclosure.
Figure 2:
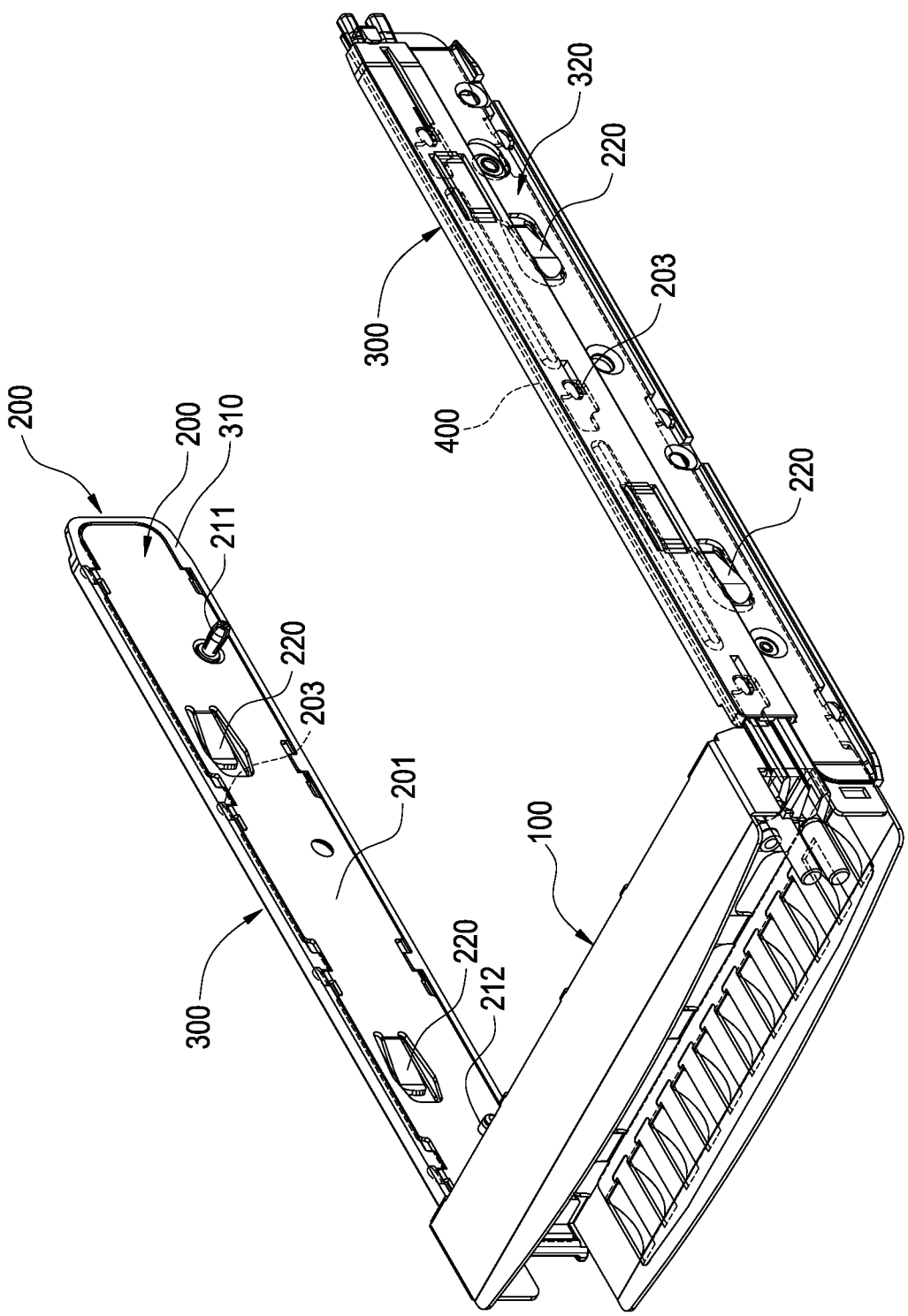
FIGS. 2 to 4 are perspective views showing the hard disk drive tray according to the first embodiment of the present disclosure.
Figure 3:
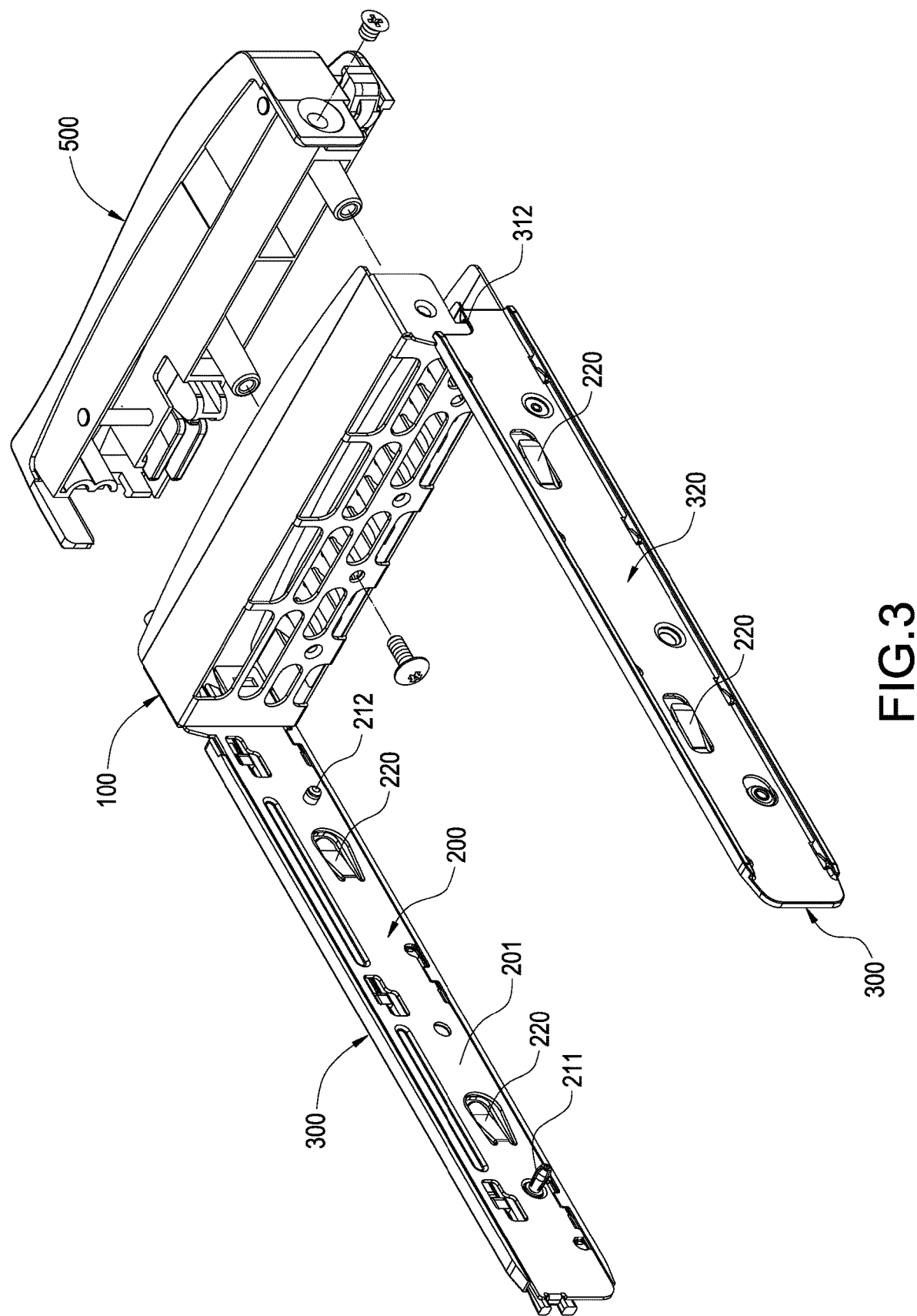
Figure 4:
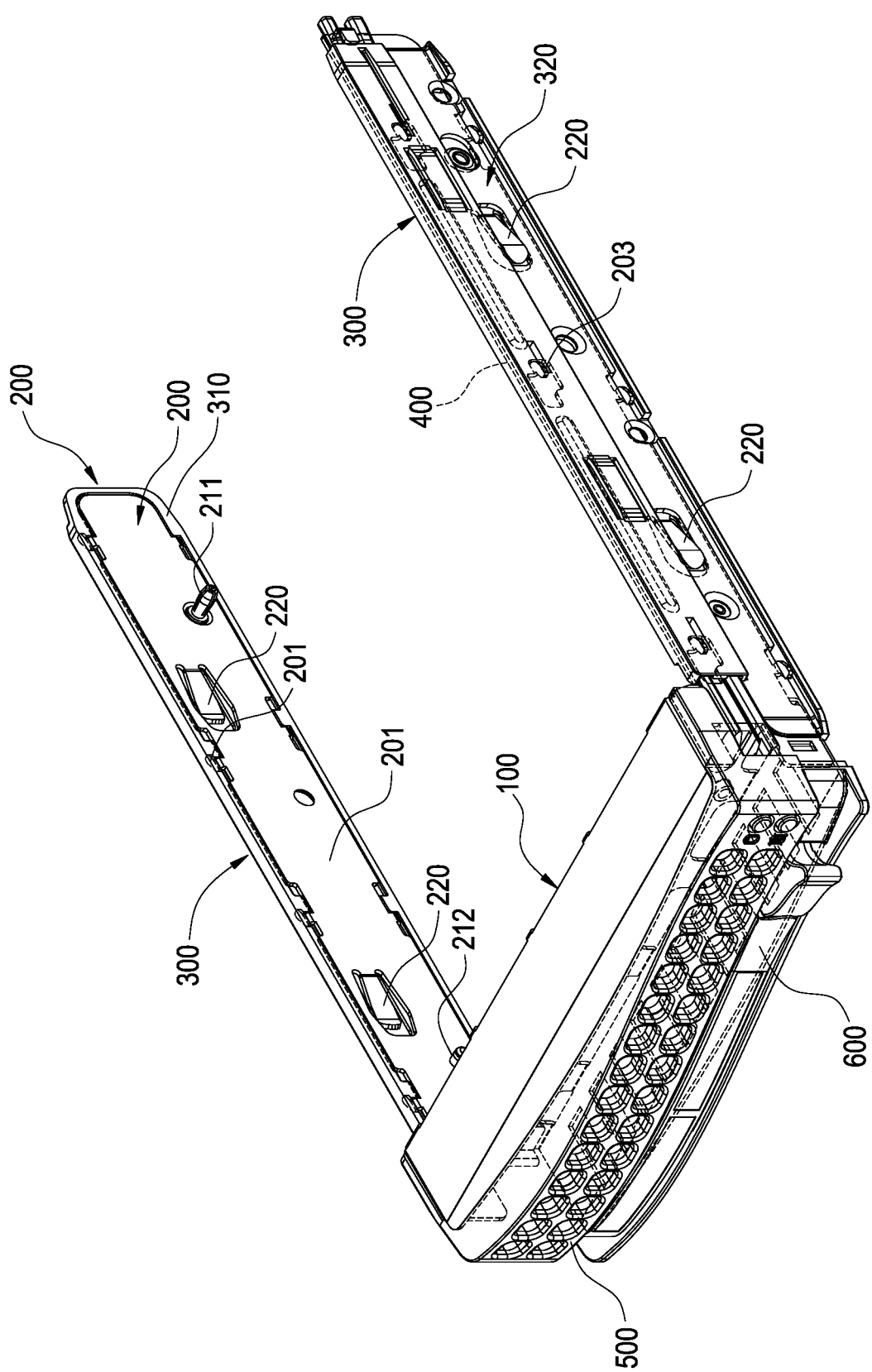

According to the first embodiment shown in FIGS. 1 to 5, a hard disk drive tray for accommodating a hard disk drive 10 is provided. A conventional hard disk drive 10 is a cube of a flat rectangular shape, a plurality of screw holes 11 are defined on the respective lateral surface of the hard disk drive 10 at long edges of the rectangle, and screws are allowed to be screwed therein. Thereby, the hard disk drive 10 could be fixed in a conventional cubic hard disk drive tray. Moreover, a connector 12 for electrically connecting with an electronic device is arranged on the hard disk drive 10 at one of the short edges of the rectangle. According to the present embodiment, the electronic device is preferably a server.

According to the present embodiment, the hard disk drive tray has a front frame 100, the front frame 100 is preferably formed on a bent metal sheet, and the front frame 100 is preferably of a bar shape. However, detail structures of the front frame 100 are not limited in the present disclosure.

An elastic cantilever plate 200 is extended from each of two ends of the front frame 100, the respective elastic cantilever plates 200 are arranged perpendicular to the front frame 100, and the couple of elastic cantilever plates 200 are arranged parallel with each other. The respective elastic cantilever plates 200 are one piece extended from the front frame 100. According to the present embodiment, the elastic cantilever plates 200 and the front frame 100 are formed on the same bent metal sheet.

Two surfaces of each elastic cantilever plate 200 are respectively an internal surface 201 and an external surface 202, and the internal surfaces 201 of the couple of elastic cantilever plates 200 are arranged opposite to each other. The external surface 202 of each elastic cantilever plate 200 is covered by a side case 300, and the side case 300 is of a strip shape corresponding to the elastic cantilever plate 200. At least one expansion fastening bolt 211 for fastening the hard disk drive 10 and at least one positioning pin 212 for inserting into and positioning the hard disk drive 10 are arranged protruding on the internal surface 201 of each elastic cantilever plate 200. According to the present embodiment, an expansion fastening bolt 211 and a positioning pin 212 are respectively riveted on the internal surface 201 of each elastic cantilever plate 200, the positioning pin 212 is disposed between the front frame 100 and the expansion fastening bolt 211, and the positioning pin 212 is shorter than the expansion fastening bolt 211. Moreover, the respective expansion fastening bolts 211 according to the present embodiment are preferably hollow, elastic and compressible, and the hard disk drive 10 could be fastened by the expansion force generated thereby.

An internal flange 310 is reversed from an edge of each side case 300, the side case 300 is surrounded by the internal flange 310 and an edge of the elastic cantilever plate 200 is covered by the internal flange 310. An opening 311 is defined on the internal flange 310 at one end of the side case 300, a latch 312 is arranged in the opening 311, the elastic cantilever plate 200 is inserted into the side case 300 through the opening 311, and the latch 312 latches the edge of the elastic cantilever plate 200. At least one hook 203 is extended from the edge of each elastic cantilever plate 200, and the respective hooks 203 hook the respective side cases 300 correspondingly covering on the respective elastic cantilever plate 200.

A slider structure 320 is formed on and external surface of each side case 300 along a longitudinal direction of each elastic cantilever plate 200. When the hard disk drive tray according to the present disclosure is inserted into the electronic device, the slider structure 320 could be engaged with another corresponding slider structure 320 in the electronic device, and the hard disk drive tray is thereby easy to be installed or uninstalled.

A positioning arm 220 is formed protruding on the external surface 202 of each elastic cantilever plate 200, and the respective positioning arms 220 penetrate the respective corresponding side cases 300 and protrude on external surface of the respective slider structure 320. When the hard disk drive tray according to the present disclosure is inserted into the electronic device, the positioning arms 220 press or latch corresponding structure(s) in the electronic device, and the hard disk drive tray is thereby positioned at a predetermined position in the electronic device.

According to the present embodiment, a communicating channel 301 is defined on one of the side cases 300 along the longitudinal direction of the corresponding elastic cantilever plate 200, and a light guiding bar 400 is inserted in the communicating channel 301. A panel 500 is arranged on the front frame 100, one end of the light guiding bar 400 exposes on the panel 500, and the other end of the light guiding bar 400 are arranged corresponding to a indicating light source in the electronic device and the indicating light source is thereby transferred to the to the panel 500 for indicating an operation situation between the electronic device and the hard disk drive 10. A handle 600 is arranged on the front frame 100, according to the present embodiment, the handle 600 is preferably pivoted on the front frame 100, and a user could hold the handle 600 to pull the hard disk drive tray out of the electronic device.

Figure 5:
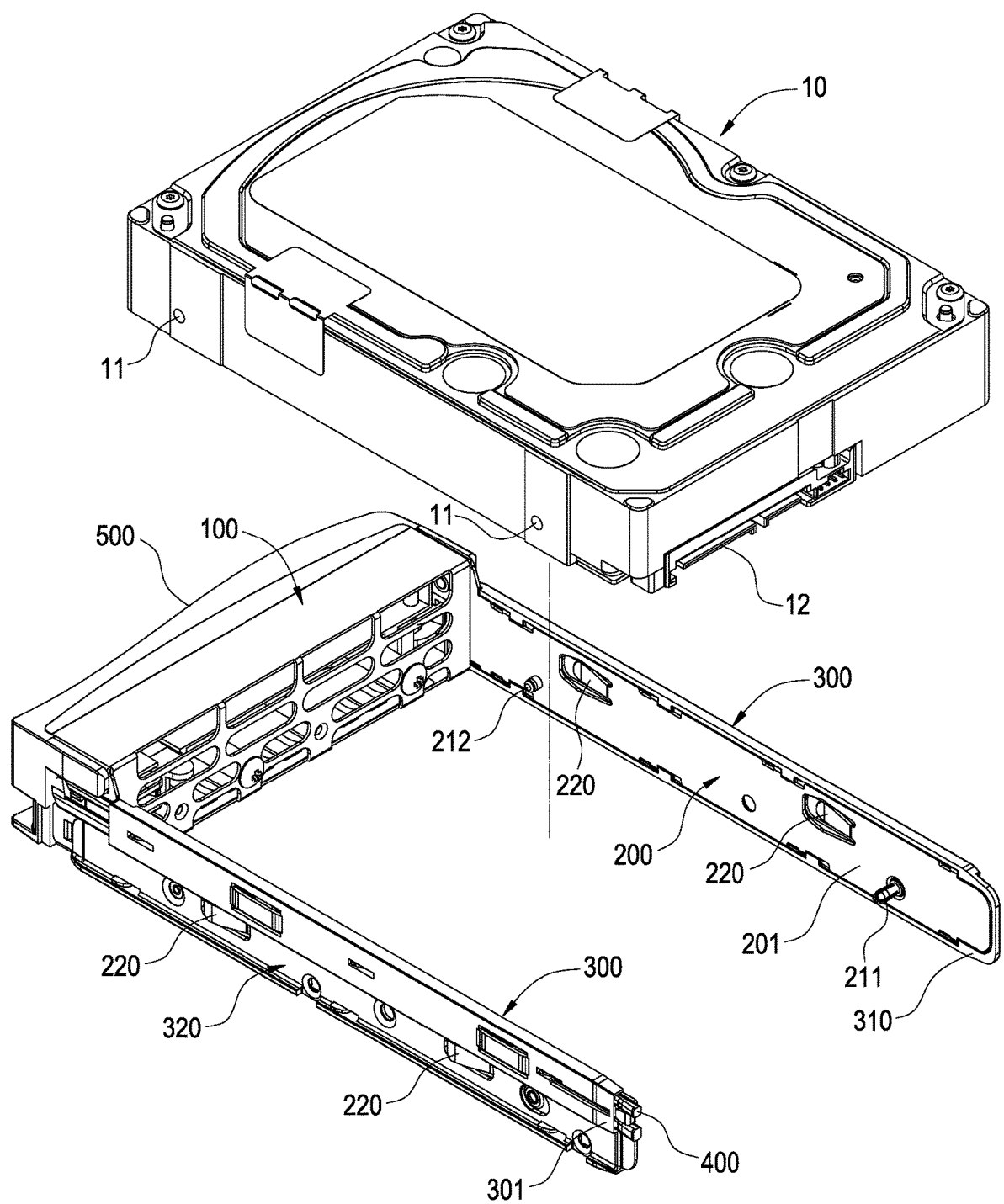
FIGS. 5 to 7 are schematic views showing status in use of the hard disk drive tray according to the first embodiment of the present disclosure.
Figure 6:
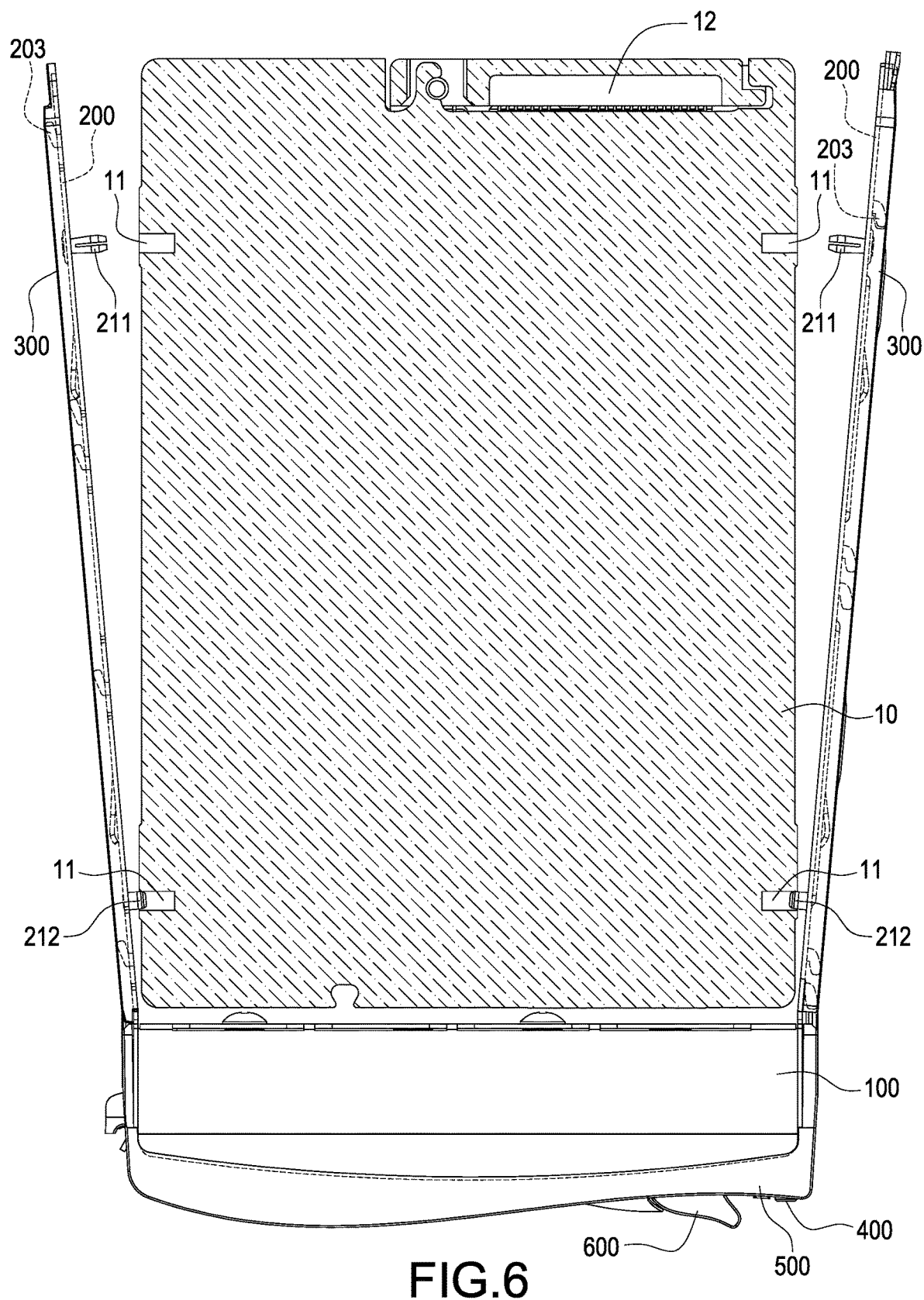
Figure 7:
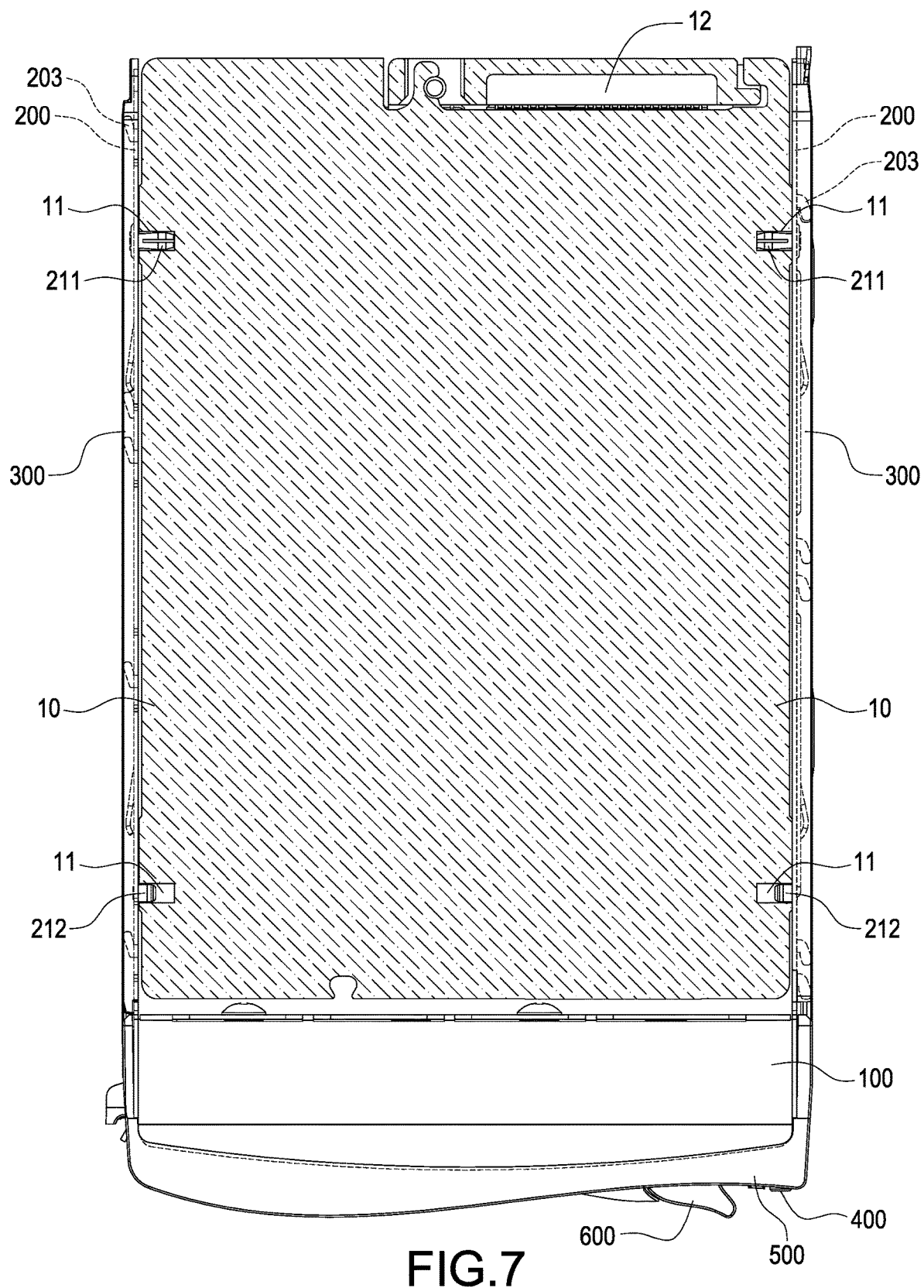

According to FIGS. 5 to 7, the hard disk drive tray of the present disclosure is used for containing a hard disk drive 10. A root portion of each elastic cantilever plate 200 is elastically deformable, and tips of the couple of elastic cantilever plates 200 could be moved far from each other by bending the respective elastic cantilever plates 200 when the hard disk drive 10 install thereinto or uninstall therefrom. Accordingly, the hard disk drive 10 is clamped between the couple of elastic cantilever plates 200 and thereby positioned. The three lateral surfaces on the hard disk drive 10 are respectively covered by the front frame 100 and the respective elastic cantilever plates 200. The other lateral surfaces on the hard disk drive 10 is exposed and the connector 12 is disposed thereon for coupling with the electronic device. The respective expansion fastening bolts 211 are inserted into the respective corresponding screw holes 11 and respectively compressed and fastened in the respective screw holes 11. The respective positioning pins 212 are fastened in the other respective corresponding screw holes 11, and the hard disk drive 10 is thereby fixed in the hard disk drive tray of the present disclosure.

The expansion fastening bolt 211 is disposed close to a tip of the elastic cantilever plate 200, and the positioning pin 212 is disposed close to a root portion of the elastic cantilever plate 200. Therefore, when the elastic cantilever plate 200 is elastically bent, the tip of the elastic cantilever plate 200 is movable in a range wider than a range which the root portion is movable therein. The positioning pin 212 is shorter than the expansion fastening bolt 211 and the elastic cantilever plate 200 is thereby prevented from over bending when inserted into the hard disk drive 10. Moreover, the expansion fastening bolt 211 is longer than the positioning pin 212 to provide a fastening force larger than the positioning pin 212.

Figure 8:
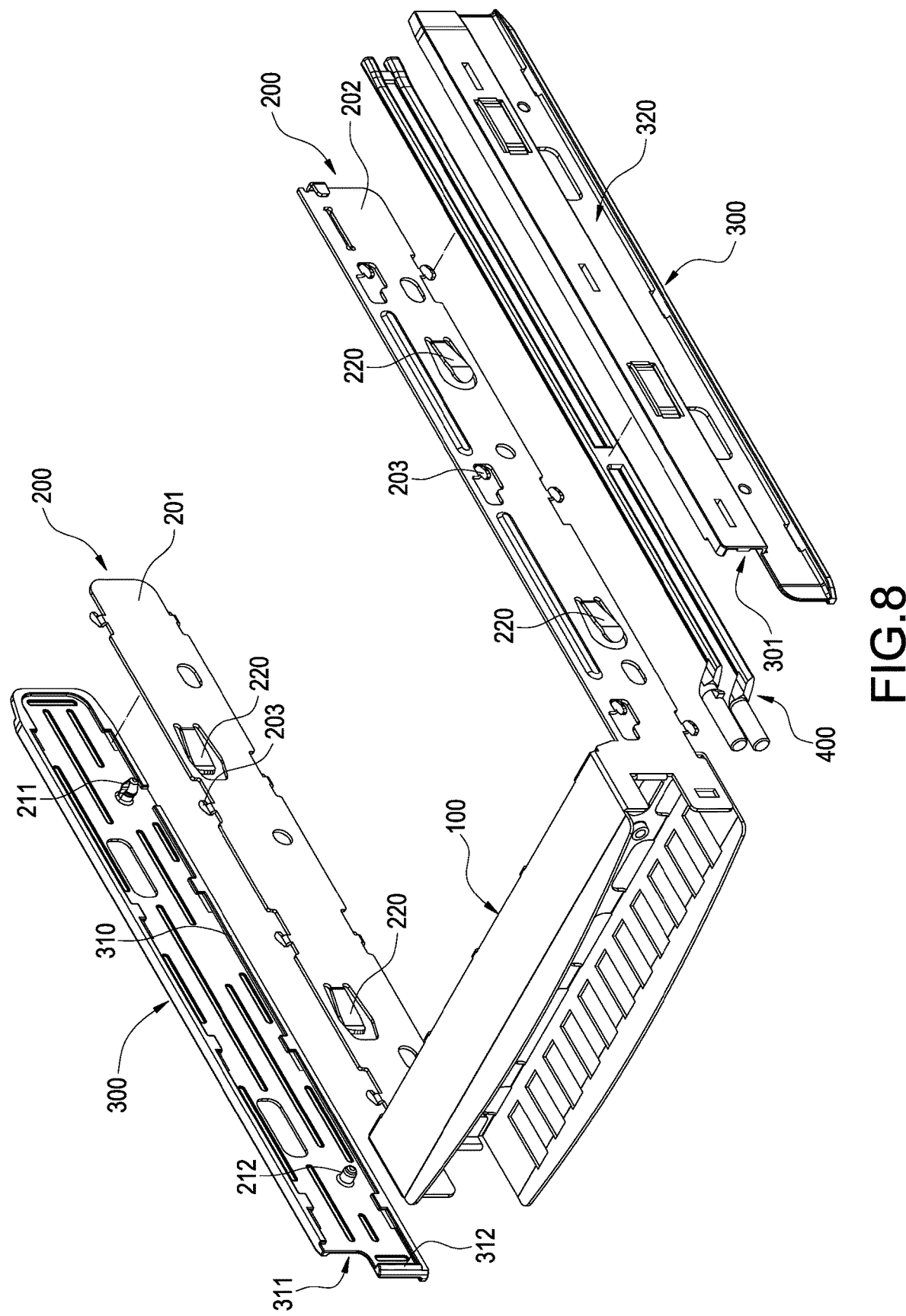
FIG. 8 is an exploded view showing a hard disk drive tray according to the second embodiment of the present disclosure.
Figure 9:
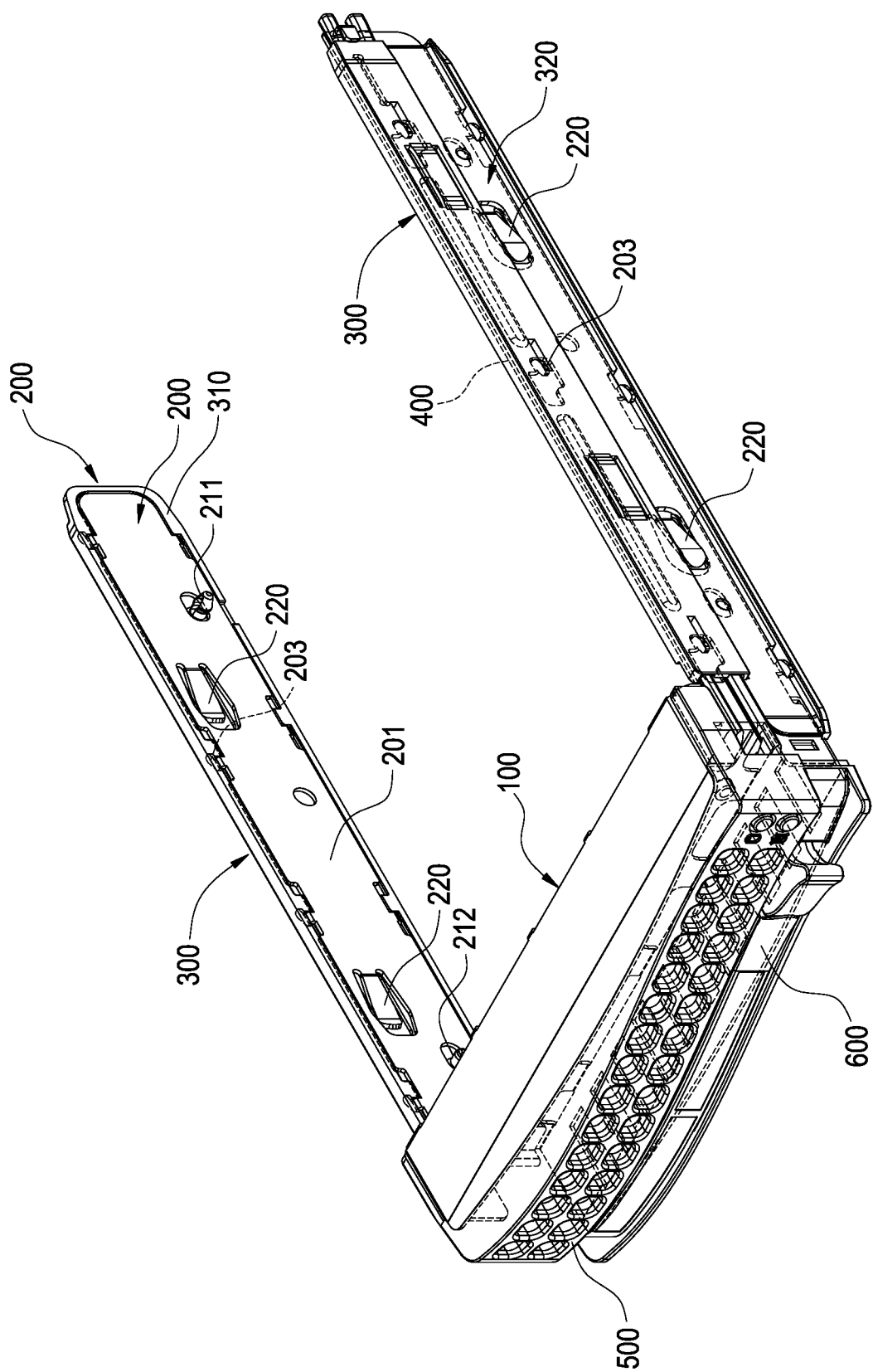
FIG. 9 is a perspective view showing the hard disk drive tray according to the second embodiment of the present disclosure.

According to the second embodiment shown in FIGS. 8 and 9, a hard disk drive tray for accommodating a hard disk drive 10 is provided. The hard disk drive tray has a front frame 100, an elastic cantilever plate 200 is extended from each of two ends of the front frame 100. The couple of elastic cantilever plates 200 are arranged parallel with each other and the hard disk drive 10 is allowed to be clamped therebetween. A lateral surface of each elastic cantilever plate 200 is covered by a corresponding side case 300 elastic cantilever plate 200 and an expansion fastening bolt 211 for fastening the hard disk drive 10 is arranged protruding from the other lateral surface of each elastic cantilever plate 200. The structures of the present embodiment are similar to the aforementioned first embodiment, the identical structures will not be repeated and the differences between the present embodiment and the first embodiment will be described in detail according to the following paragraphs.

The present embodiment is different from the first embodiment. An expansion fastening bolt 211 and a positioning pin 212 are preferably one piece formed on each side case 300. Moreover, the expansion fastening bolt 211 and the positioning pin 212 are respective arranged penetrating the elastic cantilever plate 200 and thereby respectively arranged protruding from the internal surface 201 of the elastic cantilever plate 200.

According to the hard disk drive tray of the present disclosure, the hard disk drive 10 is clamped between the couple of elastic cantilever plates 200, a place occupied by a bottom plate and a rear plate according to a conventional cubic tray is thereby released, and the structure of the hard disk drive tray is simplified. The elastic cantilever plate 200 is covered by the side case 300 and the elastic cantilever plate 200 is thereby reinforced. Moreover, the side case 300 could be used for accommodating cables or the light guiding bar 400 for connecting the respective electronic components or optical components at front and rear sides of the hard disk drive tray.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A hard disk drive tray for accommodating a hard disk drive, the hard disk drive tray comprising a front frame, an elastic cantilever plate being extended from each of two ends of the front frame, the elastic cantilever plates being coupled and arranged parallel with each other for clamping the hard disk drive between the elastic cantilever plates, a lateral surface of each elastic cantilever plate being covered by a side case and an expansion fastening bolt for fastening the hard disk drive being protruded from the other lateral surface of each elastic cantilever plate.

2. The hard disk drive tray according to claim 1, wherein at least a hook is extended from an edge of each elastic cantilever plate, and the respective hooks hook the respective corresponding side cases.

3. The hard disk drive tray according to claim 1, wherein an internal flange is formed by an inward reversed edge of the side case to be extended, and the internal flange is arranged to surround the side case and cover an edge of the elastic cantilever plate.

4. The hard disk drive tray according to claim 3, wherein an opening is defined on the internal flange at an end of the side case, a latch is arranged in the opening, the elastic cantilever plate is inserted in the side case through the opening, and the latch latches the edge of the elastic cantilever plate.

5. The hard disk drive tray according to claim 1, wherein the respective elastic cantilever plates are one piece extended from the front frame.

6. The hard disk drive tray according to claim 1, wherein a positioning pin for fastening the hard disk drive protrudes from the elastic cantilever plate, the positioning pin and the expansion fastening bolt are arranged on the same surface of the elastic cantilever plate, the positioning pin is arranged between the front frame and the expansion fastening bolt, and the positioning pin is shorter than the expansion fastening bolt.

7. The hard disk drive tray according to claim 1, wherein a slider structure arranged along a longitudinal direction of the corresponding elastic cantilever plate is formed on an external surface of each side case.

8. The hard disk drive tray according to claim 7, wherein a positioning arm is formed on a surface of each elastic cantilever plate, and the respective positioning arms are arranged to penetrate the respective corresponding side case and thereby being protruded from a surface of the slider structure.

9. The hard disk drive tray according to claim 7, wherein a communicating channel is defined on the side case and along the longitudinal direction of the corresponding elastic cantilever plate, and a light guiding bar is inserted in the communicating channel.

10. The hard disk drive tray according to claim 9, wherein a panel is arranged on the front frame and an end of the light guiding bar is exposed on the panel.

11. The hard disk drive tray according to claim 9, wherein a handle is arranged on the front frame.

\* \* \* \* \*